(12) United States Patent
Quigley et al.

(10) Patent No.: US 6,718,906 B2
(45) Date of Patent: Apr. 13, 2004

(54) DUAL SCALE VEHICLE GAUGE

(75) Inventors: Jon Quigley, Kernersville, NC (US); Michael Blackard, Madison, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 10/161,429

(22) Filed: Jun. 3, 2002

(65) Prior Publication Data

US 2003/0221606 A1 Dec. 4, 2003

(51) Int. Cl.[7] ................................................. G01P 5/00
(52) U.S. Cl. .............. 116/62.4; 116/62.3; 116/DIG. 47; 116/129; 116/116
(58) Field of Search ............... 116/62.4, 62.3, 116/62.1, DIG. 47, 129, 116; 340/688

(56) References Cited

U.S. PATENT DOCUMENTS

| | | | |
|---|---|---|---|
| 2,287,554 A | * 6/1942 | Hansen | 116/129 |
| 3,446,178 A | 5/1969 | St. Clair et al. | |
| 4,028,531 A | 6/1977 | Cottin et al. | |
| 4,054,105 A | * 10/1977 | Fegan | 116/116 |
| 4,058,080 A | * 11/1977 | Hermann | 116/DIG. 47 |
| 4,092,191 A | 5/1978 | Jones | |
| 4,229,724 A | 10/1980 | Marcus | |
| 4,284,028 A | 8/1981 | Swanburg | |
| 4,642,787 A | 2/1987 | McCarthy et al. | |
| 4,777,480 A | * 10/1988 | Okamoto et al. | 340/688 |
| 4,803,646 A | 2/1989 | Burke et al. | |
| 5,033,402 A | * 7/1991 | Peet, II | 116/DIG. 47 |
| 5,081,868 A | 1/1992 | Samson | |
| 5,245,944 A | * 9/1993 | Yamamoto | 116/DIG. 47 |
| 5,497,323 A | 3/1996 | McCall et al. | |
| 5,565,874 A | 10/1996 | Rode | |
| 5,636,145 A | 6/1997 | Gorman et al. | |
| 5,828,585 A | 10/1998 | Welk et al. | |
| 5,920,256 A | 7/1999 | Toffolo et al. | |
| 6,289,276 B1 | 9/2001 | Ahrens et al. | |
| 6,389,896 B1 | * 5/2002 | Tomita et al. | 116/62.1 |
| 6,522,381 B1 | * 2/2003 | Brandt | 116/62.1 |

* cited by examiner

Primary Examiner—Christopher W. Fulton
Assistant Examiner—Amanda J Hoolahan
(74) Attorney, Agent, or Firm—Watts Hoffmann Co, LPA (57) ABSTRACT

A dual scale gauge, such as a speedometer, for a motor vehicle. The gauge includes a mechanical indicator, an overlay, a first light source, and a second light source. The mechanical indicator moves in response to a sensed condition of the motor vehicle. The overlay is positioned behind the indicator. The overlay includes first and second scales that are only visible when illuminated. The first light source illuminates the first scale when the gauge is operated in a first mode. The second light source illuminates the second scale when the gauge is operated in a second mode.

25 Claims, 9 Drawing Sheets

DUAL SCALE VEHICLE GAUGE

FIELD OF THE INVENTION

This disclosure relates in general to dual scale vehicle gauges and, more specifically, to a back lit dual scale vehicle gauge that selectively illuminates a first scale or a second scale.

BACKGROUND OF THE INVENTION

Instrument panels 1 in vehicles traditionally include mechanical indicators 2 movable relative to a fixed gauge overlay 3. For example, a speedometer typically includes an indicator needle rotatably movable relative to a fixed gauge overlay. The overlay includes a plurality of numeric characters that define a scale 4 along the path of travel of the indicator that represent the speed of the vehicle. Most overlays include a miles per hour scale and a kilometers per hour scale. Typically, one of the scales is a primary scale with larger numeric characters and the other scale is a secondary scale with smaller numeric characters. FIG. 1B illustrates an overlay having a primary miles per hour scale and a secondary kilometers per hour scale. FIG. 2B illustrates an overlay having a primary kilometers per hour scale and a secondary miles per hour scale.

In the past, vehicle manufacturers stocked two different speedometers. The only difference between the speedometers was the scale defined on the overlay. An overlay with a primary miles per hour scale is used in speedometers for vehicles that are sold in countries that use the British measurement system. An overlay with a primary kilometers per hour scale is used in speedometers for vehicles that are sold in countries that use the metric measurement system. Most vehicle manufacturers produce vehicles that will be sold in countries that use the British measurement system and vehicles that will be sold in countries that use the metric measurement system. For example, a manufacturer of over the highway trucks and tractors may produce vehicles that will be sold in the United States and Canada. The vehicles sold in the United States will have speedometers with a miles per hour primary scale, while the vehicles sold in Canada will have speedometers with a kilometers per hour primary scale.

Digital reconfigurable displays have been developed that allow different gauges to be displayed with one display. These displays use a digital graphic representation of the traditional indicator and overlay. One reconfigurable display uses a transparent electroluminescent display to display different scales with a mechanical indicator positioned behind the display. The digital reconfigurable displays permit the user to select different gauges to be displayed, such as speed, battery, oil pressure, etc. Some digital reconfigurable displays allow the user to toggle between an miles per hour mode where a miles per hour scale is displayed and a kilometers per hour mode where a kilometers per hour scale is displayed.

One major drawback of digital reconfigurable displays is that the graphic representation of the gauge is unsatisfactory unless an expensive high resolution display is used. The pixels of a digital display do not define numeric characters that are as "crisp" or well defined as the characters stenciled into an overlay of an analog display. In addition, sun glare has a greater effect on digital displays than traditional analog displays.

There is a need for a back lit, dual scale, analog vehicle gauge that selectively illuminates a first scale or a second scale. Such a display eliminates the need for vehicle manufacturers to stock different speedometers having different overlays, is less expensive than digital reconfigurable displays and overcomes the deficiencies inherent in digital reconfigurable displays.

SUMMARY

The present disclosure is directed to a dual scale gauge for a motor vehicle. The gauge includes a mechanical indicator, an overlay, a first light source, and a second light source. The mechanical indicator moves in response to a sensed condition of the motor vehicle. The overlay is positioned behind the mechanical indicator. The overlay includes first and second scales. The first and second scales are only visible when illuminated from a back side of the overlay. A first light source is positioned behind the overlay that illuminates the first scale and does not illuminate the second scale when the gauge is operated in a first mode. A second light source is positioned behind the overlay that illuminates the second scale and does not illuminate the first scale when the gauge is operated in a second mode.

In one embodiment, the first light source includes a lamp and a light guide positioned behind the first scale that directs light from the lamp to illuminate the first scale. The second light source also includes a lamp and a light guide. The second light guide is positioned behind the second scale and directs light from the second lamp to illuminate the second scale.

In one embodiment, the first light source includes a plurality of light emitting diodes positioned behind characters of the first scale to illuminate the characters of the first scale. The second light source comprises a second plurality of light emitting diodes positioned behind characters of the second scale for illuminating characters of the second scale.

An operator may select a first mode or a second mode. Light is provided by the first light source to illuminate the first scale, but not illuminate the second scale when the first mode is selected by the user. Light is provided by the second light source to illuminate the second scale and not the first scale when the second mode is selected.

In one embodiment, the dual scale gauge is a speedometer for a motor vehicle. In this embodiment, the overlay includes a kilometers per hour scale and a miles per hour scale. The kilometers per hour and miles per hour scales are only visible when illuminated from the backside of the overlay. The first light source is used to illuminate the miles per hour scale and the second light source is used to illuminate the kilometers per hour scale.

Additional features of the invention will become apparent and a fuller understanding will be obtained by reading the following detailed description in connection with the accompanying drawings.

DETAILED DESCRIPTION OF THE INVENTION

The present disclosure is directed to a dual scale gauge 10 for a motor vehicle, such as an over the highway truck or tractor. The dual scale gauge 10 includes a mechanical indicator 12, an overlay 14, a first light source 16 and a second light source 18. The mechanical indicator 12 moves in response to a sensed condition of the vehicle. The overlay 14 is positioned behind the mechanical indicator 12. The overlay 14 includes a first scale 20 and a second scale 22. The first and second scales 20, 22 are visible only when illuminated from a back side 24 of the overlay 14 (see FIGS. 11A and 11B). The first light source 16 is positioned behind the overlay 14 such that the first light source illuminates the first scale 20 and does not illuminate the second scale 22 when the dual scale gauge 10 is operated in a first mode. The second light source 18 is positioned behind the overlay 14 such that the second light source 18 illuminates the second scale and does not illuminate the first scale when the gauge 10 is operated in a second mode.

Figure 11A:
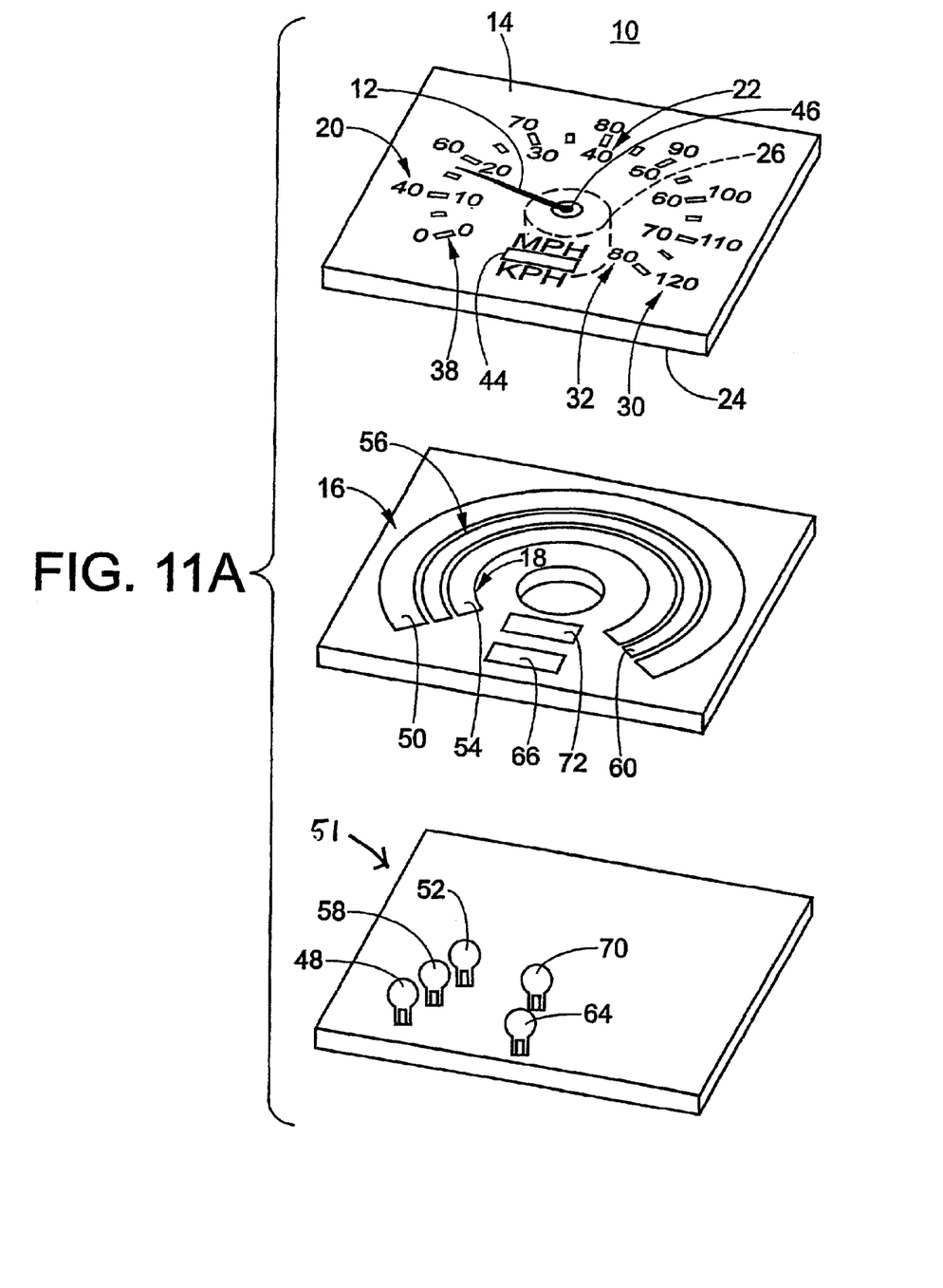
FIG. 11A is an exploded perspective view of an overlay, a tooled light guide and a light assembly.
Figure 11B:
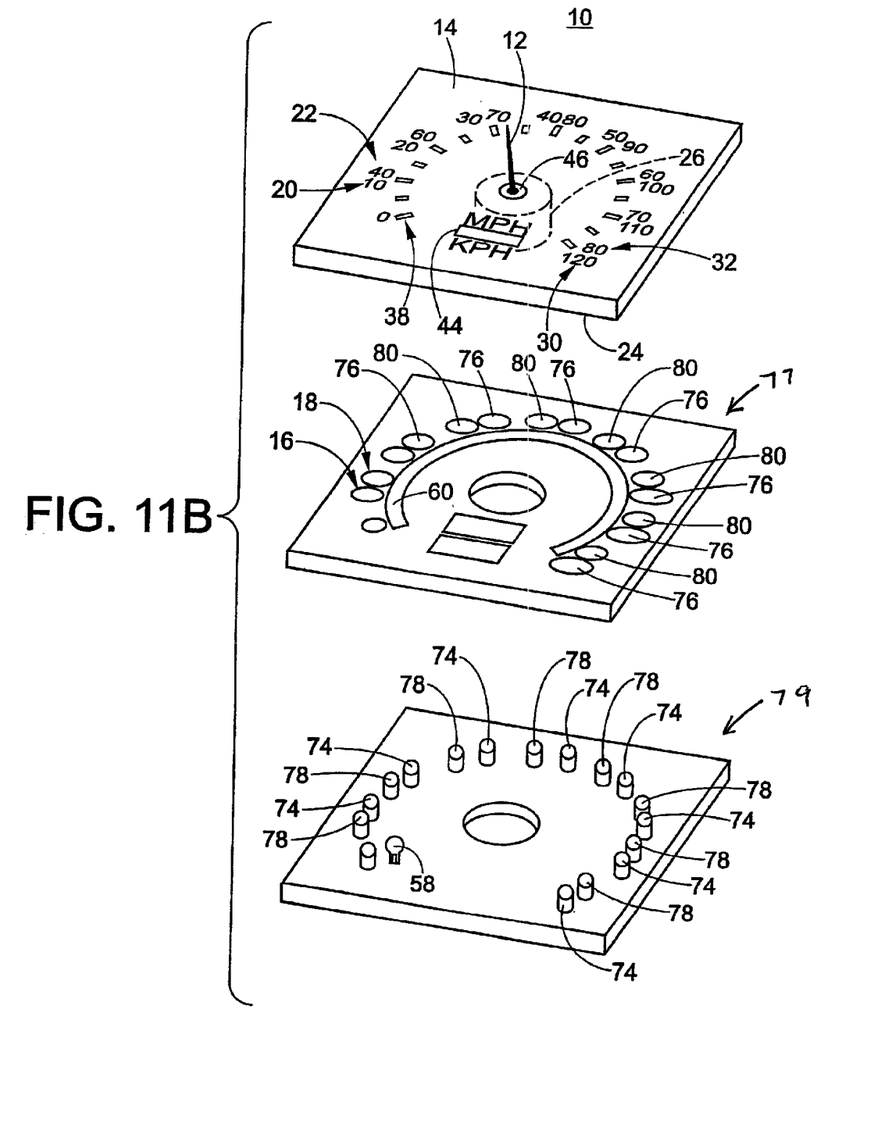
FIG. 11B is an exploded perspective view of an overlay, a tooled light guide and a LED assembly of one embodiment.

The illustrated mechanical indicator 12 is a needle. Referring to FIGS. 11A and 11B, the needle is coupled to a motor 26 positioned behind the overlay, such as a stepper motor, server motor or other known means for moving the indicator 12. In the exemplary embodiment, a controller controls the motor 26 to position the indicator 12 with respect to the overlay 14. One acceptable motor 26 is model no. X15-589, produced by Switec of Switzerland.

The illustrated overlay includes a kilometers per hour scale 30 and a miles per hour scale 32. A first set of numeric characters 34 on the overlay 14 define the kilometers per hour scale 30 (see FIGS. 4 and 8). A second set of numeric characters 36 on the overlay 14 defines the miles per hour scale 32 (see FIGS. 5 and 9). The numeric characters 34, 36 that define the kilometers per hour scale 30 and the miles per hour scale 32 are "dead faced." That is, the characters 34, 36 that define the miles per hour scale 32 and kilometers per hour scale 30 are not visible unless there is backlighting. When there is no backlighting, the area that defines the numeric characters 34, 36 blends in with the rest of the overlay 14. In the exemplary embodiment, the color of the numeric characters 34, 36 match the color of the rest of the overlay and not visible when they are not backlit. The numeric characters 34, 36 are visible when they are backlit.

In the exemplary embodiment, a set of graduations 38 is defined on the overlay 14. In the illustrated embodiment, one set of graduations 38 is included on the overlay 14 that is used with both the numeric characters 34 of the kilometers per hour scale 30 and the numeric characters 36 of the miles per hour scale 32. In an alternate embodiment, two sets of graduations could be defined on the overlay 14. One set of graduations would be included with the kilometers per hour scale 30 and a second set of graduations would be included with the miles per hour scale 32.

In the exemplary embodiment, the graduations 38 are also "dead faced" and, therefore, not visible when they are not illuminated from behind the overlay 14. When a single set of graduations 38 is used, the graduations 38 may be defined in such a way that they are visible when backlighting is not present. For example, the graduations 38 may simply be printed on a front side 40 of the overlay 14.

When a set of graduations are included with a kilometers per hour scale 30 and a second set of graduations are included with the miles per hour scale 32, the graduations are "dead faced" so that they are not visible unless there is backlighting. The set of graduations for the kilometer scale 30 is illuminated when the kilometers per hour characters 34 are illuminated and the second set of graduations are illuminated when the miles per hour characters 36 are illuminated in this embodiment.

In one embodiment, illustrated by FIGS. 3, 4, 5 and 11A, the characters 34 that define the kilometers per hour scale 30 are positioned radially outward of the set of graduations 38 and the numeric characters 36 that define the miles per hour scale 32 are positioned radially inward of the set of graduations 38. It should be readily apparent to those skilled in the art that the kilometers per hour numeric characters 34 could be positioned radially inward of the set of graduations 38 and the miles per hour numeric characters 36 could be positioned radially outward of the set of graduations. In the illustrated embodiment, the set of radially outward positioned numeric characters 34 along with the set of graduations 38 are illuminated when the gauge 10 is operated in a kilometers per hour mode. The set of radially inward positioned numeric characters 36 and the set of graduations 38 are illuminated when the gauge 10 is operated in a miles per hour mode.

In one embodiment, illustrated by FIGS. 7, 8, 9 and 11B, the numeric characters 34 that define the kilometers per hour scale 30 and the numeric characters 36 that define the miles per hour scale 32 are all defined radially outward of the set of graduations 38. The numeric characters 34 of the kilometers per hour scale 30 are positioned adjacent to the numeric characters 36 of the miles per hour scale 32 around the periphery of the set of graduations 38. The first set of numeric characters 34 are illuminated from behind the overlay 14 when the gauge 10 is operated in a kilometers per hour mode. The second set of numeric characters 36 is illuminated from behind the overlay 14 when the gauge 10 is operated in a miles per hour mode.

In the exemplary embodiment, a kilometers per hour indicator 40 and a miles per hour indicator 42 are defined on the overlay 14. In the illustrated embodiment, the kilometers per hour indicator 40 comprises the letters KPH and the miles per hour indicator 42 comprises the letters MPH.

In the exemplary embodiment, the miles per hour indicator 42 and the kilometers per hour indicator 40 are "dead faced," such that they do not appear unless they are backlit.

In the exemplary embodiment, the kilometers per hour indicator 40 is illuminated when the gauge 10 is operated in a kilometers per hour mode and the miles per hour indicator 42 is illuminated when the gauge 10 is operated in a miles per hour mode.

The illustrated overlay 14 also includes a transparent window or an opening 44 for an odometer. The overlay 14 includes a hole 46 that a shaft (not shown) of the motor 26 that moves the indicator 12 extends through.

Figure 3:
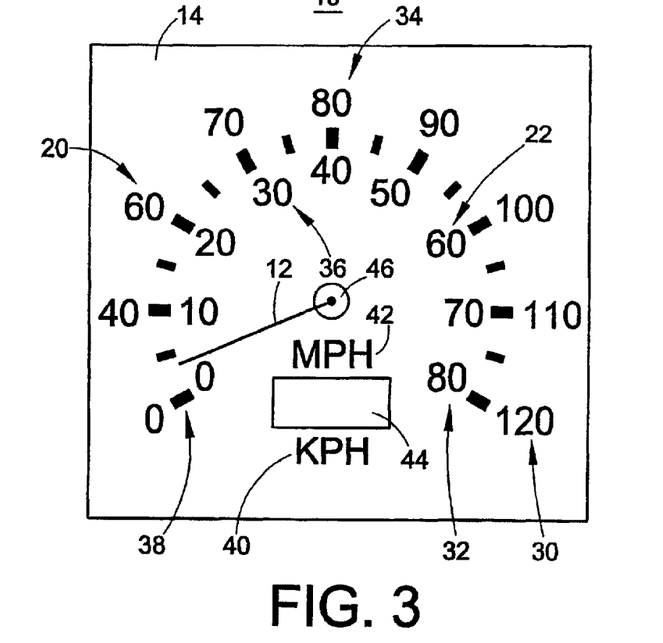
FIG. 3 is a front elevational view of an overlay for a dual mode backlit display showing both the miles per hour scale and kilometers per hour scale for illustrative purposes.
Figure 4:
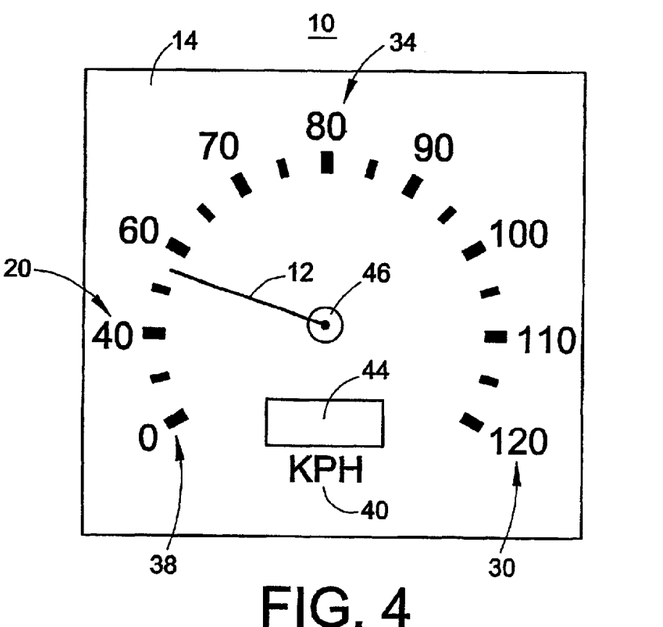
FIG. 4 is a front elevational view of an overlay for a dual mode gauge shown operating in a kilometers per hour mode.
Figure 5:
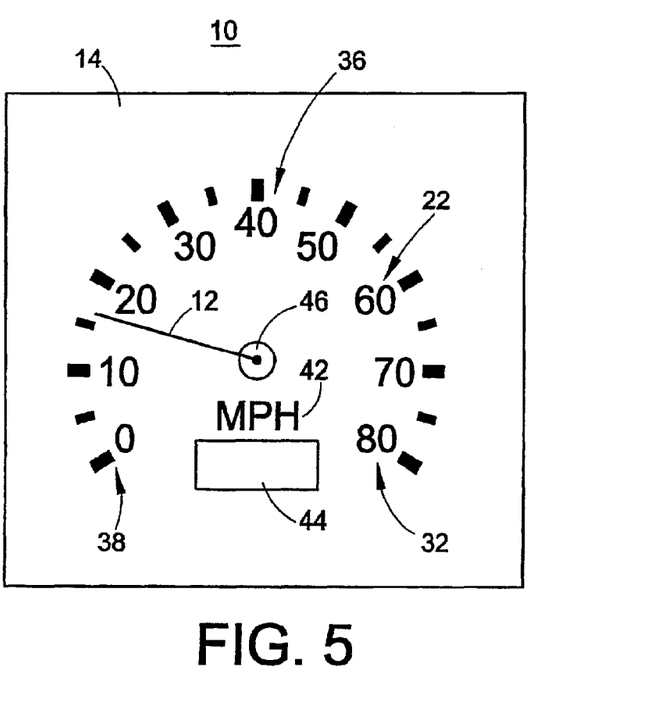
FIG. 5 is a front elevational view of an overlay for a dual mode gauge shown operating in a miles per hour mode.
Figure 6:
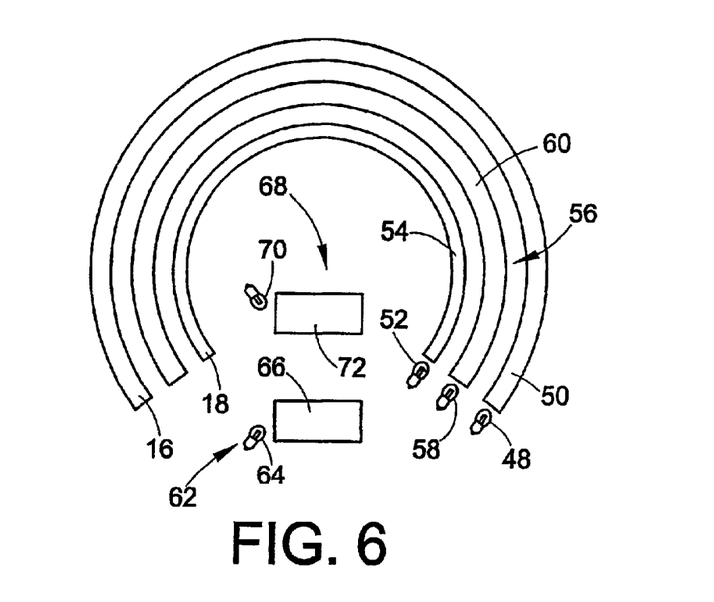
FIG. 6 is a schematic illustration of light sources for a dual mode gauge.

FIG. 6 illustrates light sources 16, 18 that are used with the overlay 14 illustrated by FIGS. 3, 4 and 5. In the illustrated embodiment, the first light source 16 is used to illuminate radially outward numeric characters 34 that define the kilometers per hour scale 30. The second light source 18 is used to illuminate radial inward numeric characters 36 of the miles per hour scale 32. In this embodiment, the first light source 16 includes a lamp 48 and an arcuate outer light guide 50. The lamp 48 and light guide 50 can be purchased as a unit that is referred to as a strip light guide. For example, a strip light guide from Polyoptical may be used. In one embodiment, a light guide positioned over an LED on a printed circuit board 51 is used to direct the light output of the LED to a desired region of the overlay.

Referring to FIG. 11A, the outer light guide 50 is positioned behind the numeric characters 34 that define the kilometers per hour scale 30. When the lamp 48 is illuminated, the outer light guide 50 directs light to the first set of numeric characters 34 that define the kilometers per hour scale 30 from behind the overlay 14 to illuminate the kilometers per hour scale 30. The second light source 18 includes a lamp 52 and an arcuate inner light guide 54. Referring to FIG. 11A, the inner light guide 54 is positioned behind the set of numeric characters 36 that define the miles per hour scale 32. When the lamp 52 is illuminated, the inner light guide 54 directs light to the second set of characters 36 that define the miles per hour scale 32 from behind the overlay 14 to illuminate the miles per hour scale 32.

In the illustrated embodiment, a light source 56 for the set of graduations 38 is included. The light source 56 for the graduations 38 includes a lamp 58 and an arcuate graduation light guide 60. The graduation light guide 60 is positioned behind the set of graduations 38. When the lamp 58 is illuminated, the graduation light guide 60 directs light to the set of graduations 38 from the back side 24 of the overlay 14 to illuminate the set of graduations 38.

A kilometers per hour indicator light source 62 includes a lamp 64 and a light guide 66. The light guide 66 directs light from the lamp 64 to illuminate the kilometers per hour indicator 40. A miles per hour indicator light source 68 includes a lamp 70 and a light guide 72. The light guide 72 directs light from the lamp 70 to the miles per hour indicator 42 to illuminate the indicator.

Figure 7:
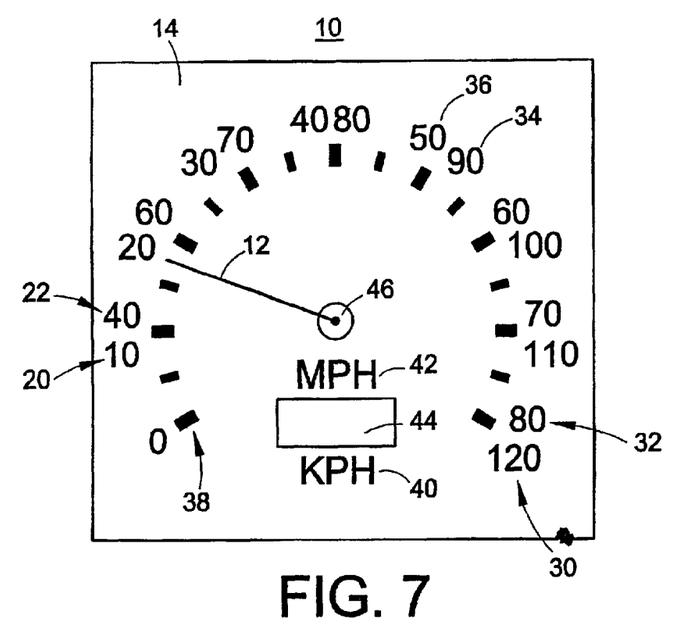
FIG. 7 is a front elevational view of an overlay for a dual mode backlit display showing both the miles per hour scale and kilometers per hour scale for illustrative purposes.
Figure 8:
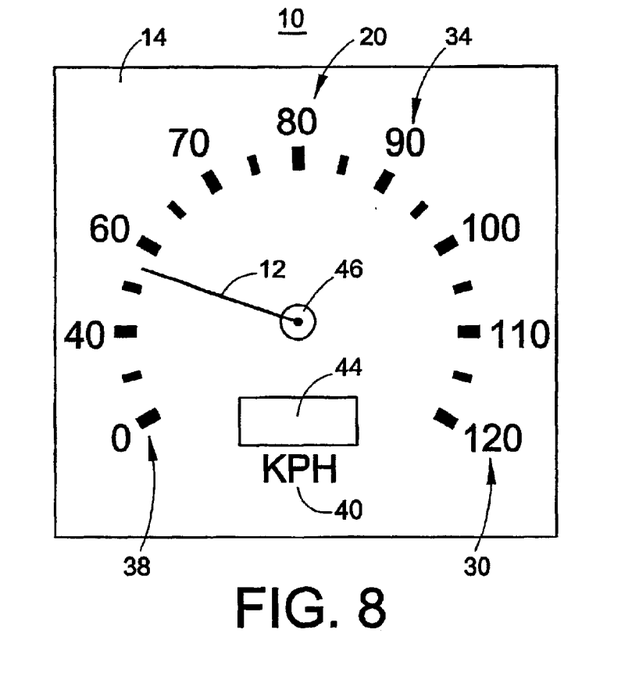
FIG. 8 is a front elevational view of an overlay for a dual mode gauge shown operating in a kilometers per hour mode.
Figure 9:
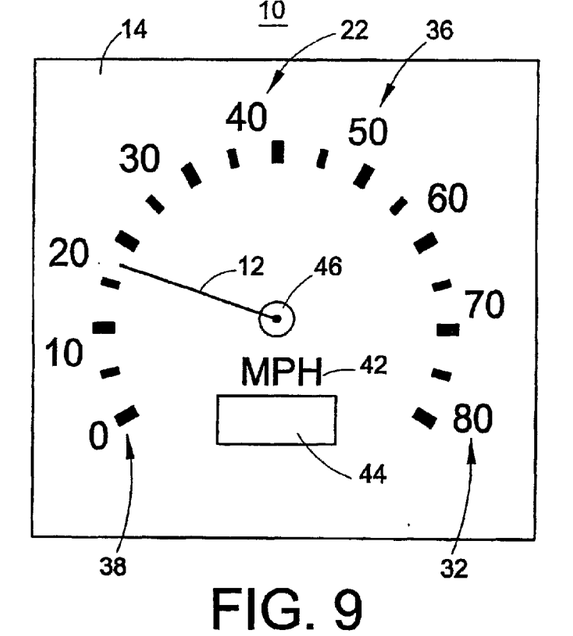
FIG. 9 is a front elevational view of an overlay for a dual mode gauge shown operating in a miles per hour mode.
Figure 10:
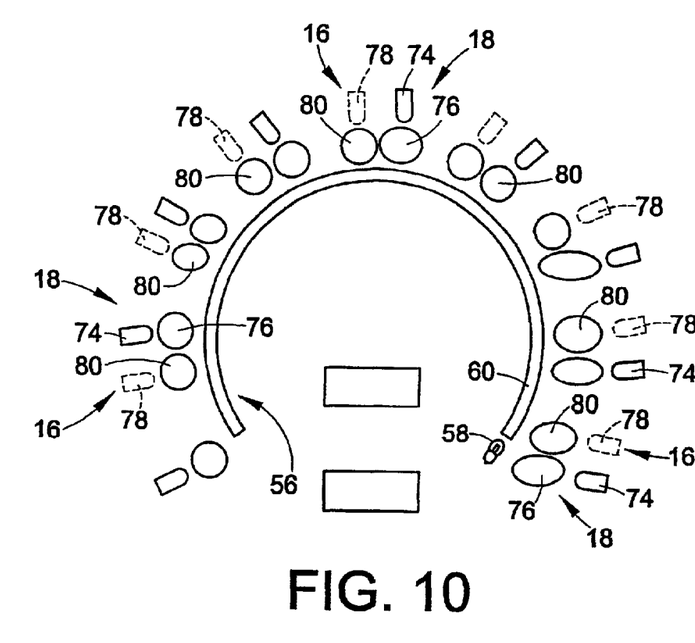
FIG. 10 is a schematic illustration of light sources for a dual mode display of one embodiment.

FIGS. 10 and 11B illustrate first and second light sources 16, 18 used to illuminate a kilometers per hour scale 30 and a miles per hour scale 32 of the overlay 14 illustrated in FIGS. 7, 8 and 9. In this embodiment, the first light source 16 includes a first set of LEDs 74 (indicated by solid lines in FIG. 10) or individual light sources and a first set of individual guides 76. As is shown in FIG. 11B, a plastic tooled part 77 fits between a printed circuit board 79 and the overlay 14 in one embodiment. The tooled part 77 include cutouts that define a light guide 76 is positioned behind each numeric character 34 of the kilometers per hour scale 30. The light guide 76 guide the discrete illumination provided by the LED's mounted on the printed circuit board onto the back of the overlay, in the areas requiring backlighting. An LED 74 is positioned behind each light guide 76 for the kilometers per hour scale 30. The set of LEDs 74 is illuminated when the gauge 10 is operated in a kilometers per hour mode. When the set of LEDs 74 is illuminated, the set of light guides 76 direct light from the set of LEDs 74 to the numeric characters 34 of the kilometers per hour scale 30. In this embodiment, the second light source 18 includes a second set of LEDs 78 and a second set of individual light guides 80. A light guide 80 is positioned behind each numeric character 36 of the miles per hour scale 32. An LED 78 or individual lamp is positioned behind each light guide 80. The second set of LEDs 78 is illuminated when the gauge 10 is operated in a miles per hour mode. When the LEDs 78 are illuminated, the light guides 80 direct light to the numeric characters 36 of the miles per hour scale 32.

The light source 56 for the set of graduations 38 includes a lamp 58 and a graduation light guide 60 as described with reference to FIG. 6. The kilometers per hour indicator light source 62 includes a lamp 64 and a light guide 66 as described with reference to FIG. 6. The miles per hour indicator light source 68 includes a lamp 70 and a light guide 72 as described with reference to FIG. 6.

In one embodiment, when first and second sets of individual light emitting diodes are used to illuminate characters 34 of the kilometers per hour scale 30 and characters 36 of a miles per hour scale 32, a light guide is not used. LEDs can be used without a light guide because of their unidirectional nature, or small beam divergence. Placement of an LED immediately behind a character to be illuminated will illuminate only the desired character.

In one embodiment, the first light source 16 provides a light having a different color than the second light source 18. As a result, the kilometers per hour scale 30 has a different color than the miles per hour scale 32. The difference in color between the two scales makes it obvious to the driver that the scale has been changed.

Figure 12:
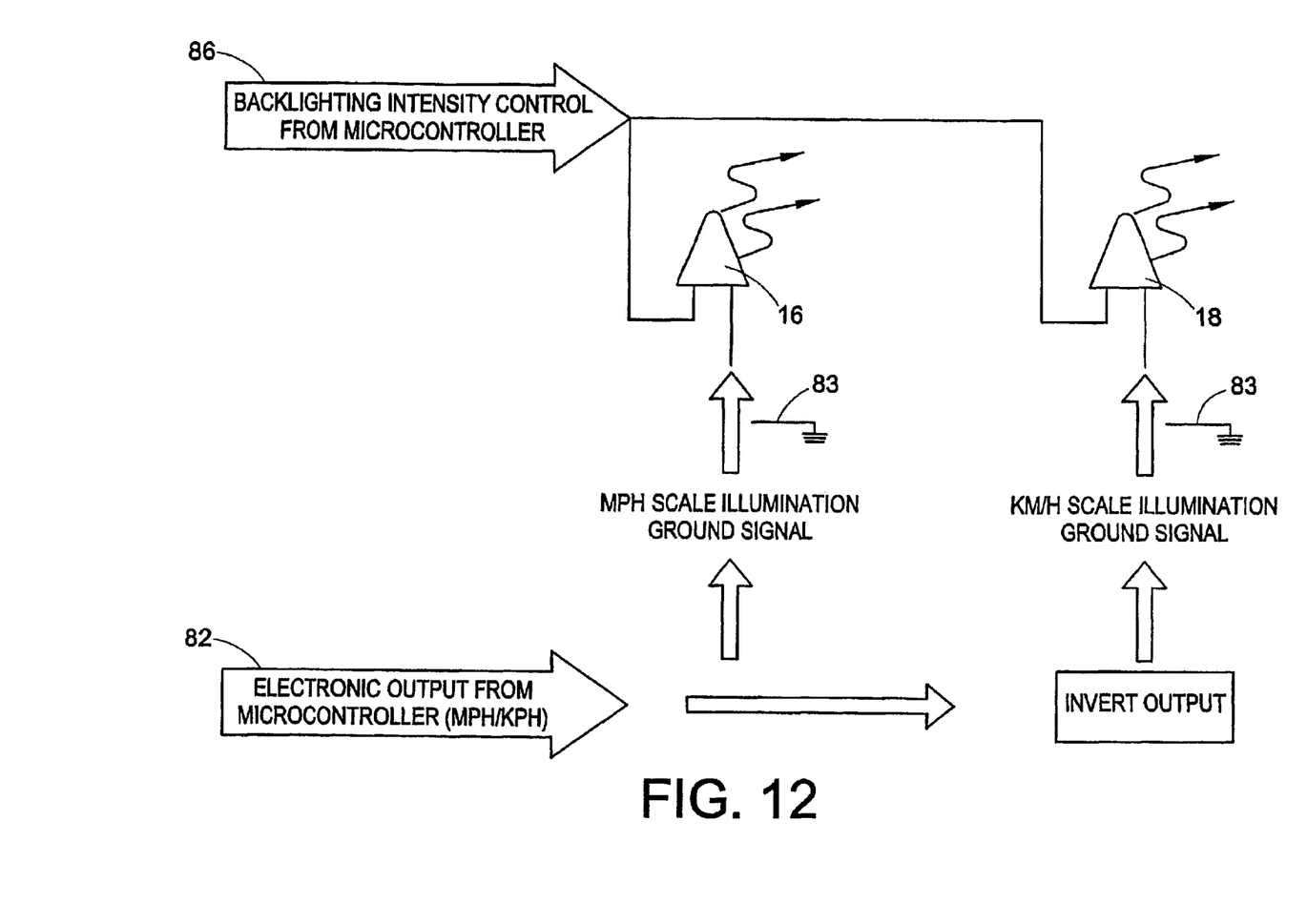
FIG. 12 is schematic representation of a control system for a dual mode gauge.

FIG. 12 is a schematic illustration of electronics that drive the dual scale gauge 10 in the exemplary embodiment. In the illustrated embodiment, a single output 82 from the controller 28 is used to turn one scale on and one scale off. The output for the controller creates a ground path 83 for the light source of the scale that is selected. For example, when a miles per hour scale is selected, the micro controller creates a ground path 83 for the light source 18 that provides light to the miles per hour scale 32. The output 82 is inverted at 84 and a ground path is not created for the light source 16 that illuminates the kilometers per hour scale 30. Similarly, when a kilometers per hour mode is selected, the signal provided to the light source 18 that illuminates the miles per hour scale 32 does not create a ground and the light source 18 is not turned on. The signal is inverted at 84 and a ground is created to the light source 16 to turn the light source on and illuminate the kilometers per hour scale 30.

An output 86 from the controller 28 is used to adjust the intensity of the back lighting applied to the selective scale. In the exemplary embodiment, a pulse width modulated signal is provided by the controller to the light source to control the intensity.

Figure 1A:
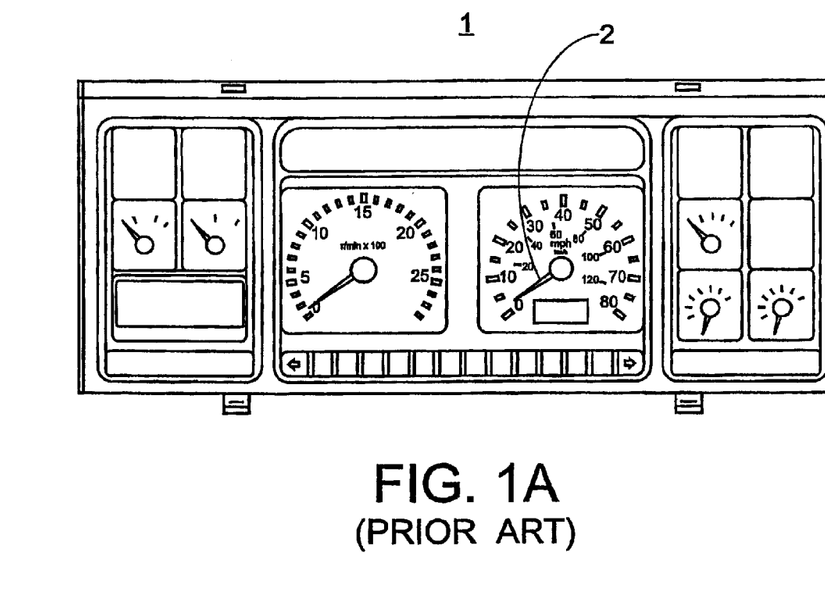
FIG. 1A is a front elevational view of a prior art instrument cluster for a vehicle.
Figure 1B:
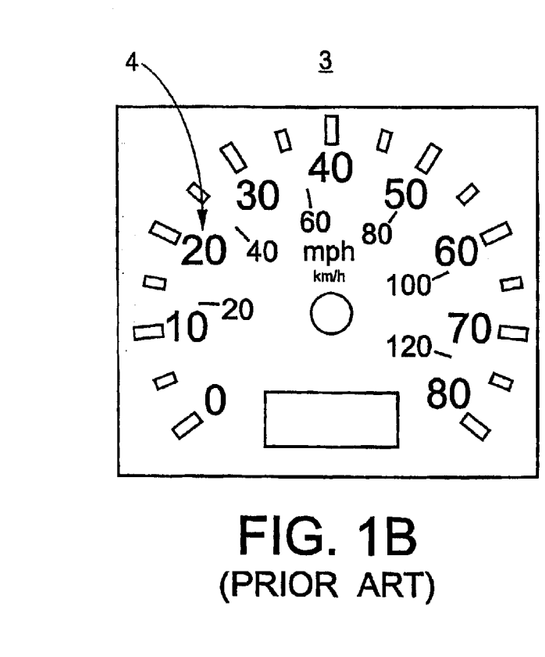
FIG. 1B is a front elevational view of a prior art overlay for a speedometer having a miles per hour primary scale and a kilometers per hour secondary scale.
Figure 2A:
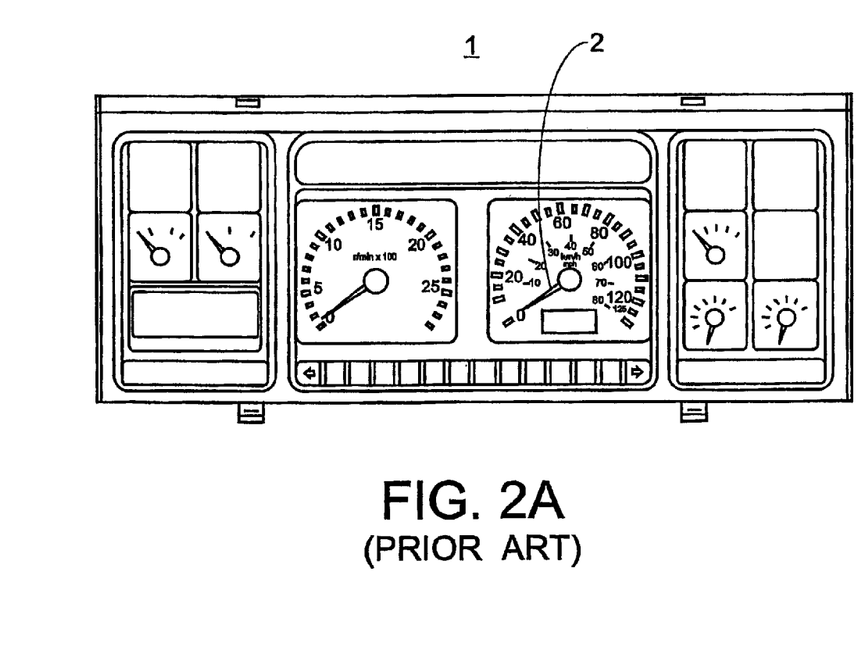
FIG. 2A is a front elevational view of a prior art instrument cluster for a vehicle.
Figure 2B:
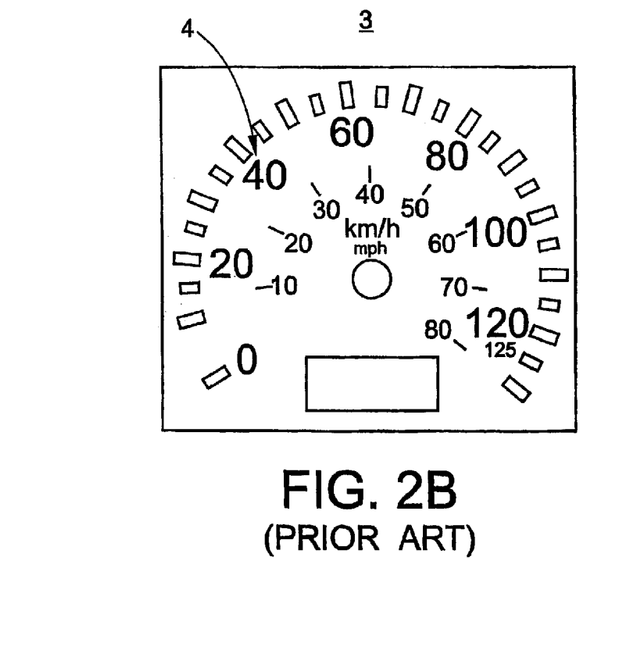
FIG. 2B is a front elevational view of a prior art speedometer overlay having a primary kilometers per hour scale and a secondary miles per hour scale.

In the illustrated embodiment, the dual mode gauge 10 is used in a cluster that has a menu labeled set-up (see FIGS. 1A and 2A). The menu allows the operator to modify a display, including the units the odometer value is displayed in. In the illustrated embodiment, the odometer can be displayed in either miles or kilometers. In the exemplary embodiment, the speedometer scale is tied to the selected odometer units. In one embodiment, the user selects instrument set-up, units, distance and selects either miles or kilometers from a display to select an odometer and speedometer that displays a miles per hour or kilometers per hour scale. In an alternate embodiment, the units for the speedometer and odometer may be selected at the factory and the option to change the units is not available to the driver.

In use, when the driver selects a miles per hour mode, the controller provides a ground path to the light source positioned behind the overlay 14 for the miles per hour scale. The light source illuminates the miles per hour scale and does not illuminate the kilometers per hour scale. When the driver selects a kilometers per hour mode, the controller provides a ground path to the light source positioned behind the kilometers per hour scale. The light source behind the kilometers per hour scale provides light to illuminate the kilometers per hour scale, but does not illuminate the miles per hour scale. When the miles per hour scale is enabled, the light source for the kilometers per hour scale does not have ground a path in the exemplary embodiment. When the kilometers per hour scale is enabled, the light source for the miles per hour scale does not have a ground path in the exemplary embodiment.

Although the present invention has been described with a degree of particularity, it is the intent that the invention include all modifications and alterations falling within the spirit or scope of the appended claims.

We claim:

1. A dual scale gauge for a motor vehicle, comprising:
   a) a mechanical indicator that moves in response to a sensed condition of a the motor vehicle;
   b) an overlay positioned behind said mechanical indicator, said overlay including a first scale having a first unit convention and a second scale corresponding to a conversion of said first unit convention into a second unit convention, said first scale and said second scale being visible only when illuminated from a back side of said overlay;
   c) a first light source positioned behind said overlay that illuminates said first scale and does not illuminate said second scale when the dual scale gauge is operated in a first mode;
   d) a second light source positioned behind said overlay that illuminates said second scale and does not illuminate said first scale when the gauge is operated in a second mode; and
   e) an actuable selector for selecting in which of said first or second modes the gauge is to be operated.

2. The dual mode gauge of claim 1 wherein said first light source comprises a lamp and a light guide positioned behind said first scale that directs light from said lamp to illuminate said first scale.

3. The dual mode gauge of claim 1 wherein said first light source comprises a plurality of light emitting diodes positioned behind alphanumeric characters of said first scale to illuminate said alphanumeric characters of said first scale.

4. The gauge of claim 1 wherein the actuable selector is a controller that manipulates a ground path to select either the first or second light source based on an input by an operator.

5. The gauge of claim 1 wherein said first scale and said second scale are illuminated in different colors.

6. A method of selectively displaying two gauge scales with a single gauge, comprising:
   a) positioning an overlay behind a mechanical indicator, said overlay including a first scale having a first unit convention and a second scale corresponding to a conversion of said first unit convention into a second unit convention that are visible only when illuminated from a back side of said overlay;
   b) providing an operator interface for selecting one of a first mode and a second mode;
   c) providing light with a first light source positioned behind an overlay that illuminates said first scale and does not illuminate said second scale when said first mode is selected; and
   d) providing light with a second light source positioned behind an overlay that illuminates said second scale and does not illuminate said first scale when said second mode is selected.

7. The method of claim 6 wherein said first scale is illuminated by a lamp that provides light to a light guide positioned behind said first scale that directs light to illuminate said first scale.

8. The method of claim 6 wherein said first scale is illuminated by a plurality of light emitting diodes positioned behind alphanumeric characters of said first scale.

9. A speed gauge for a motor vehicle, comprising:
   a) a mechanical indicator for indicating a speed of such motor vehicle;
   b) an overlay positioned behind said mechanical indicator, said overlay including a kilometers per hour scale and a miles per hour scale, said kilometers per hour scale and said miles per hour scale being visible only when illuminated from a back side of said overlay;
   c) a first light source positioned behind said overlay that illuminates said kilometers per hour scale and does not illuminate said miles per hour scale when the speed gauge is operated in a kilometers per hour mode;
   d) a second light source positioned behind said overlay that illuminates said miles per hour scale and does not illuminate said kilometers per hour scale when the speed gauge is operated in a miles per hour mode; and
   e) an actuable selector for selecting in which of said miles per hour or kilometers per hour mode the speed gauge is to be operated.

10. The speed gauge of claim 9 wherein said first light source comprises a lamp and a light guide positioned behind said kilometers per hour scale that directs light from said lamp to illuminate said kilometers per hour scale.

11. The speed gauge of claim 9 wherein said second light source comprises a lamp and a light guide positioned behind said miles per hour scale that directs light from said lamp to illuminate said miles per hour scale.

12. The speed gauge of claim 9 wherein said first light source comprises a plurality of light emitting diodes positioned behind numeric characters of said kilometers per hour scale to illuminate said numeric characters of said kilometers per hour scale.

13. The speed gauge of claim 9 wherein said second light source comprises a plurality of light emitting diodes positioned behind numeric characters of said miles per hour scale to illuminate said numeric characters of said miles per hour scale.

14. The gauge of claim 9 wherein the actuable selector is a controller that manipulates a ground path to select either the first or second light source based on an input by an operator.

15. The gauge of claim 9 wherein said first light source and said second light source produce light of different colors.

16. A method of selectively displaying a vehicle speed in kilometers per hour or miles per hour, comprising:

a) positioning an overlay positioned behind a mechanical indicator, said overlay including a kilometers per hour scale and a miles per hour scale, said kilometers per hour scale and said miles per hour scale being visible only when illuminated from a back side of said overlay;

b) providing an operator interface for selecting one of a kilometers per hour mode and a miles per hour mode;

c) providing light with a first light source positioned behind said overlay that illuminates said kilometers per hour scale and does not illuminate said miles per hour scale when the speed gauge is operated in a kilometers per hour mode; and d) providing light with a second light source positioned behind said overlay that illuminates said miles per hour scale and does not illuminate said kilometers per hour scale when the speed gauge is operated in a miles per hour mode.

17. The method of claim 16 wherein said first light source comprises a lamp and a light guide positioned behind said kilometers per hour scale that directs light from said lamp to illuminate said kilometers per hour scale.

18. The method of claim 16 wherein said second light source comprises a lamp and a light guide positioned behind said miles per hour scale that directs light from said lamp to illuminate said miles per hour scale.

19. The method of claim 16 wherein said first light source comprises a plurality of light emitting diodes positioned behind numeric characters of said kilometers per hour scale to illuminate said numeric characters of said kilometers per hour scale.

20. The method of claim 16 wherein said second light source comprises a plurality of light emitting diodes positioned behind numeric characters of said miles per hour scale to illuminate said numeric characters of said miles per hour scale.

21. A speed gauge for a motor vehicle, comprising:

a) a mechanical indicator for indicating a speed of such motor vehicle;

b) an overlay positioned behind said mechanical indicator, said overlay including a kilometers per hour scale and a miles per hour scale, said kilometers per hour scale and said miles per hour scale being visible only when illuminated from a back side of said overlay;

c) a first light guide positioned behind said kilometers per hour scale;

d) a first lamp that provides light to said first light guide when the speed gauge is operated in a kilometers per hour mode, wherein said first lamp and said first light guide illuminate said kilometers per hour scale and do not illuminate said miles per hour scale;

e) a second light guide positioned behind said miles per hour scale;

f) a second lamp that provides light to said second light guide when the speed gauge is operated in a miles per hour mode, and wherein said second lamp and said second light guide illuminate said miles per hour scale and do not illuminate said kilometers per hour scale; and g) an actuable selector for selecting in which of said miles per hour or kilometers per hour mode the speed gauge is to be operated.

22. The gauge of claim 21 wherein the actuable selector is a controller that manipulates a ground path to select either the first or second light source based on an input by an operator.

23. The gauge of claim 21 wherein said first lamp and said second lamp produce light of different colors.

24. A speed gauge for a motor vehicle, comprising:

a) a mechanical indicator for indicating a speed of such motor vehicle;

b) an overlay positioned behind said mechanical indicator, said overlay including a kilometers per hour scale and a miles per hour scale, said kilometers per hour scale and said miles per hour scale being visible only when illuminated from a back side of said overlay;

c) a first plurality of light emitting diodes positioned behind numeric characters of said kilometers per hour scale, wherein said first plurality of light emitting diodes illuminate said numeric characters of said kilometers per hour scale and do not illuminate numeric characters of said miles per hour scale;

d) a second plurality of light emitting diodes positioned behind said numeric characters of said miles per hour scale, and wherein said second plurality of light emitting diodes illuminate said numeric characters of said miles per hour scale and do not illuminate numeric characters of said kilometers per hour scale and;

e) an actuable selector for selecting which of said first plurality or second plurality of light emitting diodes should be illuminated.

25. The gauge of claim 24 wherein said first plurality of light emitting diodes and said second plurality of light emitting diodes produce light of different colors.

* * * * *